US009710803B2

(12) United States Patent
Park et al.

(10) Patent No.: US 9,710,803 B2
(45) Date of Patent: Jul. 18, 2017

(54) MOBILE TERMINAL, SECURITY SERVER AND PAYMENT METHOD THEREOF

(71) Applicant: Samsung Electronics Co., Ltd., Suwon-si, Gyeonggi-do (KR)

(72) Inventors: Sun-eung Park, Suwon-si (KR); Do-jun Yang, Yongin-si (KR); Tae-kwang Um, Suwon-si (KR); Cheol-ju Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/190,760

(22) Filed: Feb. 26, 2014

(65) Prior Publication Data
US 2014/0306004 A1   Oct. 16, 2014

(30) Foreign Application Priority Data
Apr. 16, 2013  (KR) ........................ 10-2013-0041753

(51) Int. Cl.
*G06K 5/00*   (2006.01)
*G06F 7/08*   (2006.01)
*G06K 19/06*  (2006.01)
*G06Q 20/32*  (2012.01)
*G06Q 20/34*  (2012.01)

(52) U.S. Cl.
CPC ....... *G06Q 20/3278* (2013.01); *G06Q 20/352* (2013.01)

(58) Field of Classification Search
CPC .. G06Q 20/32; G06Q 20/322; G06Q 20/3221; G06Q 20/3223; G06Q 20/3227; G06Q 20/327; G06Q 20/3278; G06Q 20/34; G06Q 20/352

USPC ........ 235/380, 381, 492; 705/16, 17, 35, 39, 705/41, 44, 64, 65, 67
See application file for complete search history.

(56) References Cited

U.S. PATENT DOCUMENTS

| 7,194,438 | B2 | 3/2007 | Sovio et al. |
| 7,357,309 | B2 | 4/2008 | Ghosh et al. |
| 7,664,702 | B2 | 2/2010 | Jung et al. |
| 8,046,261 | B2 | 10/2011 | Ghosh et al. |
| 8,811,895 | B2 * | 8/2014 | Reisgies et al. ............. 455/41.1 |
| 2010/0114773 | A1 | 5/2010 | Skowronek |

(Continued)

FOREIGN PATENT DOCUMENTS

| KR | 10-0854797 B1 | 8/2008 |
| KR | 10-2011-0117744 A | 10/2011 |
| KR | 10-2012-0101143 A | 9/2012 |

*Primary Examiner* — Thien M Le
*Assistant Examiner* — April Taylor
(74) *Attorney, Agent, or Firm* — Jefferson IP Law, LLP

(57) ABSTRACT

A mobile terminal is provided. The mobile terminal includes a short-range communicator, a security server and a payment method thereof, the mobile terminal including a short-range communicator which exchanges data by a predetermined short-range technology, a payment processor which performs a payment process corresponding to a preset standard in response to a user's request for payment, and a secure world which communicates with the payment processor, extracts secure information from data and stores the data therein and masks the secure information from the outside. Thus, the secure data may be masked at the time of communication with the outside.

20 Claims, 8 Drawing Sheets

(56) References Cited

U.S. PATENT DOCUMENTS

| | | |
|---|---|---|
| 2011/0078081 A1* | 3/2011 | Pirzadeh ................ G06Q 20/20 |
| | | 705/44 |
| 2012/0095852 A1* | 4/2012 | Bauer .................. G06Q 20/105 |
| | | 705/16 |
| 2012/0143707 A1 | 6/2012 | Jain |
| 2013/0013433 A1 | 1/2013 | Rose et al. |
| 2013/0060706 A1 | 3/2013 | Aabye et al. |
| 2013/0080241 A1 | 3/2013 | Fisher |
| 2013/0086375 A1 | 4/2013 | Lyne et al. |

\* cited by examiner

MOBILE TERMINAL, SECURITY SERVER AND PAYMENT METHOD THEREOF

CROSS-REFERENCE TO RELATED APPLICATION(S)

This application claims the benefit under 35 U.S.C. §119 (a) of a Korean patent application filed on Apr. 16, 2013 in the Korean Intellectual Property Office and assigned Serial No. 10-2013-0041753, the entire disclosure of which is hereby incorporated by reference.

TECHNICAL FIELD

The present disclosure relates to apparatuses and methods consistent with the various embodiments relate to a mobile terminal including a Near Field Communication (NFC) module, a security server and a payment method thereof. More particularly, the present disclosure relates to a mobile terminal, a security server and a payment method thereof which includes an NFC module and provides a payment service using a contactless card.

BACKGROUND

The popularity of smart phones in recent years has led to the widespread use of mobile phones equipped with a short-range communicator such as a Near Field Communication (NFC) module for exchanging data through contactless near field communication technology, as well as increased provision of NFC-based services. Among others, payment services using the NFC technology are expected to grow further, and credit card companies, Value Added Network (VAN) service providers, and mobile telecommunication companies around the world are launching their own services relating to payment services to attract users.

Credit cards are transitioning from existing magnetic stripe cards to contactless cards with improved security, and such contactless cards are being developed into mobile cards in line with the NFC technology for smart phones. The mobile card which is installed in a smart phone enables users to make payments both online and offline and provides a convenient payment service for users, and thus demand for such cards is on the rise.

To provide such payment service using the mobile card, offline stores may have an NFC reader module installed in a Point Of Sales (POS) machine in their stores to approve the mobile card, and transactions using the contactless cards are made through the NFC reader installed in the POS machine. More specifically, if a customer purchases goods, the seller inputs the price or product information and asks the customer to contact the card to the POS machine. If the customer contacts his/her contactless card (mobile card) to the POS machine, a predetermined process (e.g., contactless Europay, MasterCard and Visa (EMV) process) is performed, and an authentication process such as affixing a signature or inputting a Personal Identification Number (PIN) number is performed. If the process is successfully completed, the POS machine transmits information of the contactless card, which has been extracted through the aforementioned process, to a Payment Service Provider (PSP) server for approval. If the POS machine obtains normal approval from the PSP server, a receipt for the purchase is output and the purchase process is completed.

A mobile version of the POS machine has been launched to perform the purchase process of the POS machine on mobile phones. If a smart phone is equipped with an NFC module, the role of the NFC reader of the existing POS machine is performed by the smart phone itself, and the payment process has also been developed to be performed on the mobile phone.

However, in the case of the mobile POS based on smart phones, anyone can develop/distribute/install applications since the smart phone has an open-type platform. Thus, secure data of the contactless card, i.e., card number, name and other important information may be exposed by an application including a malicious code created for malicious purposes. Also, the NFC process of smart phones is not encoded, and if a user reads data of the contactless card through the NFC function of the smart phone, the data are transmitted in the un-encoded form from an NFC chip as hardware of the smart phone to the highest application terminal, and there is a possibility of exposing information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile terminal including a short-range communicator configured to exchange data using a predetermined short-range technology, a payment processor configured to perform a payment process corresponding to a preset standard in response to a user's request for payment, and a secure world configured to communicate with the payment processor, to extract secure information from data, to store the data therein, and to mask the secure information from the outside.

The payment processor may be configured to generate a first command corresponding to the user's payment request, and the secure world may be configured to transmit a second command generated by adding corresponding secure information to the received first command, to a contactless card through a Near Field Communication (NFC) processor of the short-range communicator, and to transmit to the payment processor a first response generated by extracting and filtering secure information from a second response transmitted by the contactless card through the NFC processor.

The secure world may be provided outside the short-range communicator, and the secure world may be configured to encode the second command, to transmit the encoded second command to the short-range communicator, to decode the second response transmitted by the short-range communicator, and to extract the secure information from the decoded second response.

The short-range communicator may be configured to transmit to the contactless card a third command which is generated by decoding a second command transmitted by the secure world, through the predetermined short-range technology, and to transmit to the secure world the second response which is generated by encoding a third response transmitted by the contactless card through the predetermined short-range technology.

The secure world may include an NFC key manager configured to store therein an NFC key used to encode or decode data.

The secure world may include a data storage part configured to store the secure information therein, and a security processor configured to generate the second command by loading secure information from the data storage part, to extract secure information from the second response, and to store the extracted secure information in the data storage part.

The secure world may be provided within the short-range communicator, and the NFC processor of the short-range communicator and the secure world may be configured to exchange un-encoded data.

The first command may include a secure data list, and the second command may be generated by adding secure information to the first command corresponding to the secure data list.

The mobile terminal may further include a Point Of Sales (POS) application configured to receive product information, to transmit a payment requesting message to the payment processor corresponding to the payment request, and to receive a response result message from the payment processor corresponding to the first response.

The mobile terminal may further include an online transaction unit configured to receive an approval requesting message from the POS application according to the response result message, and to transmit the approval requesting message to a security server.

The online transaction unit may be configured to receive the encoded secure information of the contactless card from the secure world, and to transmit to the security server an approval request message including the encoded secure information.

The secure world may further include an online transaction key manager configured to store therein an online transaction key used to encode or decode data, and the online transaction key manager may be configured to transmit the online transaction key to the security server.

The secure world may further include an online transaction key manager configured to store therein an online transaction key input by the security server, and the online transaction key manager may be configured to generate a one-time key by using the input online transaction key, and the online transaction unit may encode secure information included in the approval requesting message by using the one-time key.

The online transaction unit may be configured to receive the approval result message of the PSP server from the security server in response to the approval requesting message, and to transmit the approval result message to the POS application.

The POS application may output the approval result message.

In accordance with an aspect of the present disclosure, a payment method of a mobile terminal is provided. The payment method includes a short-range communicator for exchanging data through a predetermined short-range technology, the payment method including receiving a user's payment request, performing a payment process according to a preset standard, wherein the performing of the payment process includes extracting secure information from data and storing the secure information in a secure world of the mobile terminal, and the secure information is masked from the outside of the secure world is provided.

The payment method may further including generating a first command by a payment processor according to the preset standard in response to the user's payment request, generating a second command by the secure world by adding corresponding secure information to the first command, transmitting the second command by the secure world to the short-range communicator, receiving a second response by the secure world from the short-range communicator corresponding to a response from the contactless card with respect to the second command, and making a first response by the secure world to the payment processor which is generated by extracting and filtering secure information from the second response.

The secure world may be provided outside the short-range communicator, and the payment method further include encoding the second command and transmitting the encoded second command to the short-range communicator, decoding the second response transmitted by the short-range communicator, and extracting the secure information from the decoded second response.

The payment method further include transmitting to the contactless card a third command which is generated by the short-range communicator by decoding the second command transmitted by the secure world, through the predetermined short-range technology, and transmitting to the secure world a second response which is generated by the short-range communicator by encoding a third response transmitted by the contactless card, through the predetermined short-range technology.

The payment method may further include transmitting an NFC key stored in the secure world, to the short-range communicator.

The payment method may further include storing secure information in the secure world, and the generating the second command may include generating the second command by loading the stored secure information.

The payment method may further include storing in the secure world the secure information which has been extracted from the second response.

The secure world may be provided in the short-range communicator, and the second command and the second response may be exchanged in an un-encoded form between the NFC processor of the short-range communicator and the secure world.

The first command may include a secure data list, and the second command may be generated by adding to the first command the secure information corresponding to the secure data list.

The payment method may further include transmitting by the POS application to the payment processor a payment requesting message corresponding to the payment request according to the input of product information, and receiving a response result message by the POS application from the payment processor corresponding to the payment requesting message and according to the first response.

The payment method may further include receiving an approval requesting message by an online transaction unit from the POS application according to the response result message, and transmitting the approval requesting message by the online transaction unit to the security server.

The payment method may further include receiving encoded card information of the contactless card by the online transaction unit from the secure world, and the transmitting the approval requesting message may include transmitting to the security server the approval requesting message including the encoded secure information.

The payment method further includes transmitting an online transaction key stored in the secure world to the security server.

The payment method may further include inputting the online transaction key by the security server to an online transaction key manager in the secure world, generating a one-time key by the online transaction key manager by using the input online transaction key, and encoding the secure information included in the approval requesting message, by the online transaction unit through the one-time key.

The payment method may further include receiving by the online transaction unit from the security server an approval result message of a PSP server with respect to the approval requesting message, and transmitting the received approval result message to the POS application.

The payment method may further include outputting the approval result message by the POS application.

In accordance with another aspect of the present disclosure, a security server which is capable of communicating with a mobile terminal is provided. The security server includes a short-range communicator for exchanging data with the outside by a predetermined short-range technology, wherein the security server is configured to receive from the mobile terminal an encoded approval requesting message corresponding to a user's payment request and comprising card information of a contactless card, decode and transmit the approval requesting message to a Payment Service Provider (PSP) server, receive from the PSP server an approval result message corresponding to the approval requesting message, and transmit the approval result message to the mobile terminal.

The security server may be configured to exchange an online transaction key used for encoding or decoding data, with the mobile terminal, and to decode the approval requesting message by using the online transaction key.

The security server may be configured to input the online transaction key to the mobile terminal, and to receive and decode an approval requesting message that is encoded by a one-time key generated by using the input online transaction key.

In accordance with an aspect of the present disclosure, a payment method of a security server which is capable of communicating with a mobile terminal is provided. The payment method includes a short-range communicator for exchanging data with the outside by a predetermined short-range technology, the payment method including: receiving from the mobile terminal an encoded approval requesting message corresponding to a user's payment request and including card information of a contactless card, decoding the approval requesting message through an online transaction key and transmitting the approval requesting message to an PSP server, receiving from the PSP server an approval result message corresponding to the approval requesting message, and transmitting the received approval result message to the mobile terminal is provided.

The payment method may further include receiving from the mobile terminal an online transaction key for encoding or decoding data, and the approval requesting message may be decoded by the received online transaction key.

The payment method may further include inputting the online transaction key by the security server to the mobile terminal, and the approval requesting message may be encoded by a one-time key generated by using the input online transaction key.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
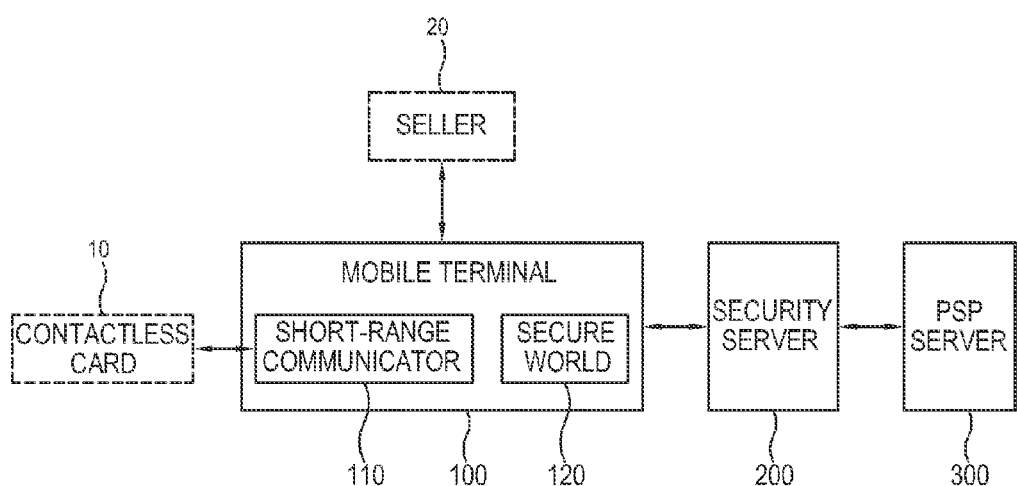
FIG. 1 is a block diagram of system for providing payment service according to an embodiment of the present disclosure.

FIG. 1 is a block diagram of a system for providing payment service according to an embodiment of the present disclosure.

Referring to FIG. 1, the system for providing payment service according to the embodiment includes a mobile terminal 100 in which a short-range communicator 110 is installed, a security server 200 and a Payment Service Provider (PSP) server 300. The short-range communicator 110 according to the present embodiment may be implemented as a near field communication (NFC) module (hereinafter, to be also referred to as a "NFC module").

The mobile terminal 100 provides a payment service using a predetermined short-range communication technology, for example, NFC technology. To provide such service, the mobile terminal 100 exchanges data with the outside by using the predetermined short-range communication technology such as NFC technology through the short-range communicator 110 that is provided within the mobile terminal 100. The short-range communicator 110 may act as an NFC reader. The short-range communicator 110 may be implemented as an NFC chip provided within the mobile terminal 100. The short-range communicator 110 may include an NFC processor (111 in FIGS. 2 and 511 in FIG. 4) as hardware which performs an NFC process.

The mobile terminal 100 according to the embodiment may exchange data with a contactless card (e.g. mobile credit card) 10 by the NFC technology through the short-range communicator 110 to perform a payment process.

The contactless card 10 may be implemented as an Integrated Circuit (IC) credit card which supports a payment service according to preset standards (e.g. Europay, MasterCard and Visa (EMV)), and the contactless card 10 according to the present embodiment includes a mobile card installed in a smart phone of a purchaser. If the contactless card 10 is installed in a smart phone, the smart phone may include an NFC module to support the NFC technology.

The mobile terminal 100 according to the present embodiment is a mobile terminal of a seller 20 which acts as a mobile Point Of Sales (POS) and may be implemented as, e.g., a smart phone in which a POS application (140 in FIG. 2) is installed. The seller 20 may execute the POS application 140 in the mobile terminal 100 and use an NFC payment service. In the present embodiment, a user of the mobile terminal 100 may include a store owner or employee as a seller of goods who uses a mobile POS function, and sellers such as taxi drivers or courier service providers or other delivery men who travel a lot due to the nature of their tasks.

A secure world 120 which stores secure data therein as in FIG. 1 is set in the mobile terminal 100. The secure world 120 is a memory area the data in which is prevented from being exposed to the outside, and is highly secured to which any unauthorized external access is blocked.

In the present embodiment, secure data (hereinafter, to be also referred to as secure information) such as a purchaser's credit card information (e.g., card number, valid term, etc.) are stored only in the secure world 120, and masked from other areas of the mobile terminal 100 excluding permitted elements and the secure world 120, and thus the secure data are not divulged to the outside. That is, in the present embodiment, pre-permitted elements of the mobile terminal 100 such as the short-range communicator 110, the payment processor 130 that is described further below, the POS application 140 and the online transaction unit 150 are permitted to access the secure world 120. Accordingly, unpermitted elements (e.g., applications not related to NFC payment service) are blocked from accessing the secure data, and the secure data are prevented from being exposed to other elements. The secure data (e.g. card number) which are exchanged among the permitted elements and the secure world 120 are exchanged in the encoded form.

Thus, even if an application including a malicious code is installed in the mobile terminal 100, it is not permitted to access the secure world 120, and the secure data may be protected from any malicious code that is distributed for malicious purposes. Also, the secure data which are transmitted to the element which is permitted to access the secure world 120 is transmitted in the encoded form, and thus security may be guaranteed even if the secure data are exposed to the outside.

FIG. 1 illustrates an example of the secure world 120 that is separated from the short-range communicator 110 within the mobile terminal 100, but the present embodiment also includes the case where the secure world 120 is provided within the short-range communicator 110. If the secure world 120 is provided in the short-range communicator 110, an NFC key exchanging process and encoding and decoding processes for exchanged data (e.g., a second command and a second response) are skipped in the course of communication between the short-range communicator 110 and the secure world 120 according to an embodiment in FIG. 2.

The security server 200 forms an encoding channel with the mobile terminal 100, receives an approval requesting message of the contactless card 10 from the mobile terminal 100 and transmits the approval requesting message to the PSP server 300. The approval requesting message includes secure data (e.g., card information) of the contactless card 10, and the secure data may be encoded by using an online transaction key, which is described further below.

More specifically, the mobile terminal 100 and the security server 200 exchange the online transaction key at the time of an online transaction for requesting approval of the contactless card 10, and the mobile terminal 100 may encode and transmit secure data to the security server 200 by using the exchanged online transaction key. The security server 200 decodes the encoded secure data by using the exchanged online transaction key.

The present embodiment includes the case of using a Derived Unique Key Per Transaction (DUKPT) in encoding the data exchanged between the mobile terminal 100 and the security server 200. If the DUKPT is used, once the security server 200 inputs the online transaction key in advance to the mobile terminal 100, an online transaction key manager (527 in FIG. 3) generates a one-time key. At the time of the online transaction for requesting approval of the contactless card 10, the mobile terminal 100 may encode and transmit the secure data to the security server 200 by using the one-time key that has been generated in advance. Since the security server 200 is aware of the online transaction key information that has been input to the mobile terminal 100 in advance, the security server 200 may decode the secure data transmitted by the mobile terminal 100, without any key exchanging process. Accordingly, if the DUKPT is used, the mobile terminal 100 and the security server 200 do not need to exchange the online transaction key whenever an online transaction is performed.

The security server 200 according to the present embodiment may be implemented as an Exchange to Exchange (E2E) server which relays payment service between the mobile terminal 100 and the PSP server 300.

Upon receiving an approval requesting message of the contactless card 10 from the security server 200, the PSP server 300 determines the availability of payment, processes the approval of payment and transmits the processing result to the security server 200. The PSP server 300 according to the present embodiment includes card companies, banks, and mobile telecommunication service providers as payment service providers with respect to transactions between the seller 20 and the purchaser.

Figure 2:
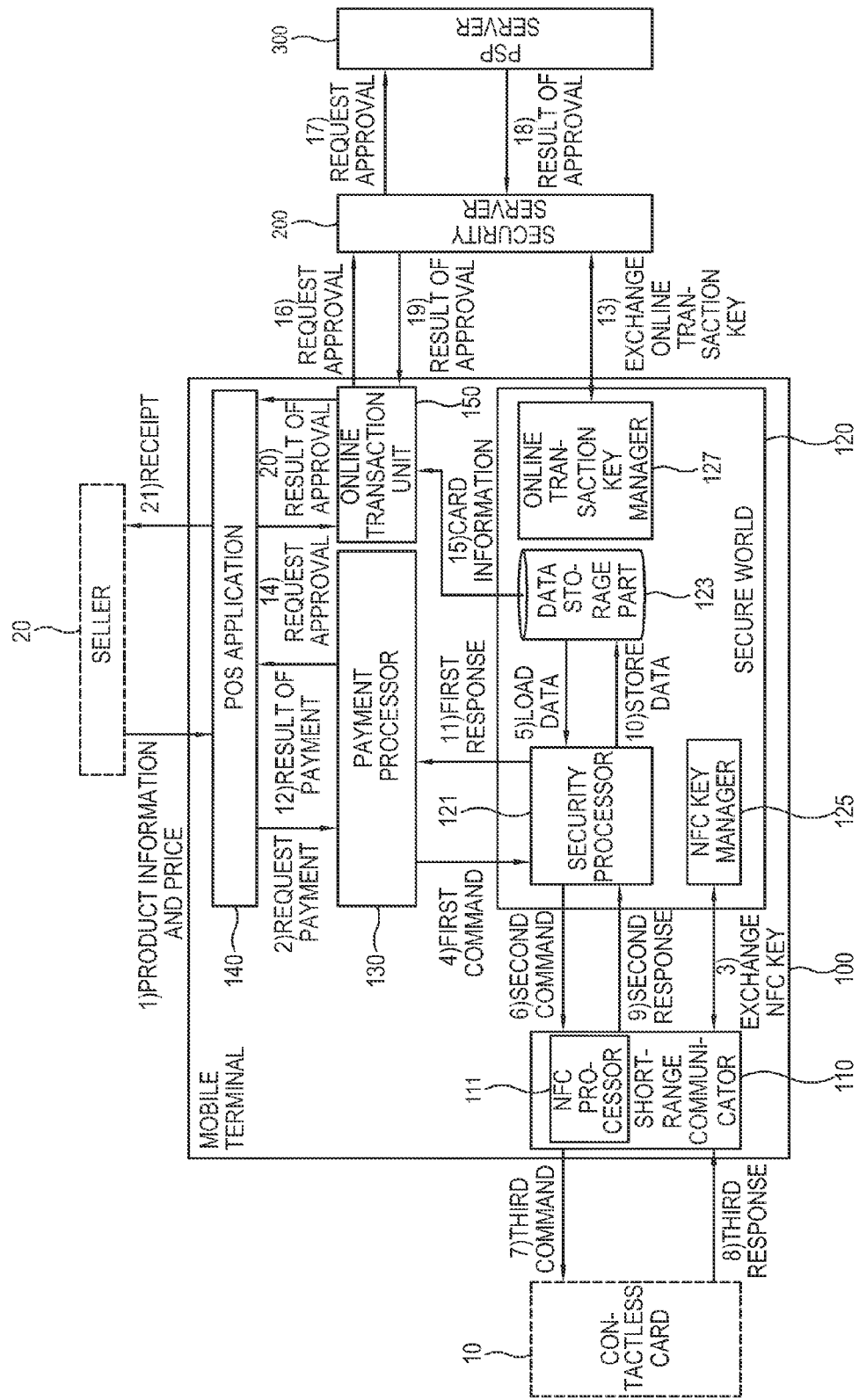
FIG. 2 is a block diagram showing a detailed configuration of a mobile terminal in FIG. 1 according to a first embodiment of the present disclosure.

FIG. 2 is a block diagram of a detailed configuration of the mobile terminal 100 in FIG. 1 according to a first embodiment of the present disclosure.

Referring to FIG. 2, the mobile terminal 100 according to the first embodiment further includes a payment processor 130, a POS application 140 and an online transaction unit 150 in addition to the short-range communicator 110 and the secure world 120. The secure world 120 of the mobile terminal 100 may include a security processor 121, a data storage part 123, an NFC key manager 125 and an online transaction key manager 127.

The payment processor 130 performs a payment process according to preset standards. For example, the payment processor 130 may be implemented as a combined form of software (e.g., program or application) supporting and EMV process and a Central Processing Unit (CPU) of the mobile terminal 100. In the present embodiment, an example of the payment processor 130 which is implemented as an EMV processor performing the EMV payment process is explained. However, the payment process according to the present embodiment is not limited to the foregoing, and may include online/offline payment processes according to various standards.

The POS application 140 is installed in the mobile terminal 100 and executed by the user (e.g., seller) 20. The seller 20 may input product information or price by executing the POS application 140, and if product information is input in advance, the price of the product may be calculated automatically. The seller 20 may input product information (or price) from the POS application 140, and select to purchase the product in the contactless card 10.

According to the result of the payment process between the payment processor 130 and the contactless card 10, the online transaction unit 150 transmits an approval requesting message to the security server 200. The online transaction unit 150 may include wired/wireless communication modules for communicating with the outside including the security server 200.

The security processor 121 performs a process relating to secure data out of the payment process of the payment processor 130. In the present embodiment, an example of the security processor 120 which is implemented as a secure EMV processor is explained, but the standard of the payment process is not limited thereto. The data which are transmitted to or by the security processor 121 are data excluding secure data (fractional data or partial data), or if the data are full data including secure data, the data may be transmitted in an encoded form. The security processor 121 may transmit or receive encoded data by using the NFC key, which is described further below.

The data storage part 123 may store therein secure data related to the NFC payment service, and may be accessed by the security processor 121 or the online transaction unit 150. The secure data stored in the data storage part 123 may include card information of the contactless card 10 such as a card number and a valid term, and the security processor 121 may load the secure data from the data storage part 123 in the course of the payment process or filter and store the secure data in the data storage part 123. The secure data (e.g., card number) which is loaded from the data storage part 123 to the online transaction unit 150 may be encoded by the online transaction key, which is described below.

The NFC key manager 125 generates and stores therein an NFC key for encoding or decoding NFC communication data exchanged between the short-range communicator 110 and the secure world 120 within an Operating System (OS) of the mobile terminal 100. The NFC key manager 125 exchanges the NFC key with the short-range communicator 110. The NFC key manager 125 may further exchange the NFC key with the payment processor 121.

In the present embodiment, the NFC data which are transmitted to or by the short-range communicator 110 in the mobile terminal 100 are transmitted and received in the encoded form by the NFC key generated by the NFC key manager 125. For example, a command which is transmitted by the security processor 121 to the short-range communicator 110 is encoded through the NFC key by the security processor 121 and transmitted in the encoded form to the short-range communicator 110, and the short-range communicator 110 decodes the received command by using the NFC key exchanged between the short-range communicator 110 and the NFC key manager 125. The short-range communicator 110 may transmit the decoded command to the contactless card 10. Likewise, the short-range communicator 110 receives a response from the contactless card 10, encodes the response through the NFC key and transmits the encoded response to the security processor 121. The security processor 121 may decode the received response by using the NFC key, filter the secure data therefrom and make a response to the payment processor 130 based on the filtering result. Accordingly, even if the NFC data are exposed to elements (outside) other than those directly transmitting and receiving the NFC data, the NFC data cannot be read without the NFC key, and thus security may be guaranteed.

The online transaction key manager 127 stores therein an online transaction key for encoding or decoding data including an approval requesting message transmitted to the security server 200. The online transaction key manager 127 exchanges an online transaction key with the security server 200. For example, the approval requesting message which is transmitted by the online transaction unit 150 to the security server 200 is encoded through the online transaction key by the online transaction key 150 and is transmitted in the encoded form to the security server 200, and the security server 200 decodes the approval requesting message by using the online transaction key exchanged between the security server 200 and the online transaction key manager 127. The security server 200 transmits the decoded approval requesting message to the PSP server 300, receives an approval result message from the PSP server 300 and transmits the approval result message to the online transaction unit 150. The message which is exchanged between the security server 200 and the PSP server 300 may be encoded by a preset method as agreed in advance between the security server 200 and the PSP server 300.

Hereinafter, a payment service process of elements of the mobile terminal 100 according to a first embodiment will be described in more detail with reference to FIG. 2.

Operation 1) Input product information: A user (e.g., seller) 20 may request for payment of the product through the POS application 140 installed in the mobile terminal 100. A user may input the payment request through the mobile terminal 100 by executing the POS application 140, and inputting product information and price.

Operation 2) Request payment: The POS application 140 transmits a payment requesting message to the payment processor 130 in response to the user's payment request.

Operation 3) Exchange NFC key: the NFC key manager 125 exchanges the NFC key for encoding and decoding data, with the short-range communicator 110 to the protect the NFC communication data. The short-range communicator 110 and the security processor 121 encode or decode the data by using the exchanged NFC key.

Operation 4) Transmit first command (partial; plain): According to the payment requesting message transmitted by the POS application 140, the payment processor 130 generates a first command according to a preset standard, and transmits the first command to the security processor 121 of the secure world 120. In the present embodiment, an example of the preset standard is EMV and an example of the first command is an EMV command. The first command may be un-encoded, i.e., plain EMV command as fractional (or partial) data including secure data list to be added.

Operation 5) Load secure data: The security processor 121 receives the first command, and loads the secure data corresponding to the secure data list from the data storage part 123. The security processor 121 may determine whether the received first command includes the secure data list, and may load the concerned secure data according to the determination result. The loaded secure data may include card information of the contactless card 10 as the secure data which should be transmitted to the contactless card 10 in the course of exchanging a plurality of data as needed for the EMV payment process between the contactless card 10 and the mobile terminal 100.

Operation 6) Transmit second command (full; encoded): The security processor 121 combines the first command and the data loaded from the data storage part 123 and encodes the combined data through the NFC key exchanged in the process 3) above, and generates a second command. The second command is a full EMV command including secure data, and transmitted in the encoded form to the short-range communicator 110. The encoded second command is transmitted to the short-range communicator 110 and thus the command may be transmitted to the contactless card 10.

Operation 7) Transmit third command (full; plain): The short-range communicator 110 generates a third command by decoding the second command, and transmits the third command by the NFC technology to the contactless card 10. The third command is a plain, full EMV command including secure data.

Operation 8) Transmit third response (full; plain): The short-range communicator 110 receives a third response by the NFC technology from the contactless card 10 corresponding to the third command. Like the third command, the third response is a plain, full EMV response including secure data. The secure data may include card information of the contactless card 10, e.g. card number, valid term, etc.

Operation 9) Transmit second response (full, encoded): The short-range communicator 110 generates a second response by encoding the third response through the NFC key, and transmits the second response to the security processor 121. The second response is an encoded, full EMV response including secure data (e.g., card information).

Operation 10) Store secure data: The security processor 121 decodes the second response, and if the decoded response includes secure data, extracts, i.e., filters the secure data and stores the secure data in the data storage part 123. The filtered secured data may include card information of the contactless card 10.

Operation 11) Transmit first response (partial; plain): The security processor 121 transmits to the payment processor 130 a first response generated by filtering the secure data from the second response. The first response transmitted to the payment processor 130 is a plain EMV response as partial (fractional) data excluding secure data. The EMV process is performed by using the decoded first response.

In the present embodiment, in the case of the data which should be secured like the card number of a purchaser, the filtered first response is transmitted to the payment processor 130 to store the data in the secure world 120 and prevent the secure data from being exposed to elements of the mobile terminal 100 other than the secure world 120.

The processes of transmitting, loading and storing the data according to the payment process in operations 4) to 11) above may be repeatedly performed depending on the standard of the payment process (e.g., EMV payment process). Accordingly, during the payment process, data communication between the short-range communicator 110 and the contactless card 10 by the NFC technology is continuously performed. The payment processor 130 sequentially performs the processes for the repetitive payment process, and transmits the result as the final result (e.g., EMV result) for the payment request in the operation 2) above, to the POS application 140.

Operation 12) Transmit payment result: The payment processor 130 completes all of the payment processes in operations 4) to 11) above, and transmits to the POS application 140 a response result message as a final payment result corresponding to the first response. The response result message may include a determination result for the validity of the contactless card 10 and appropriateness of the payment.

Operation 13) Exchange online transaction key: If an online transaction is required to approve the contactless card 10 according to the result of the EMV payment process, the online transaction key manager 127 exchanges the online transaction key for encoding/decoding data, with the security server 200 for performing an encoded online transaction. The security server 200 and the online transaction unit 150 encode or decode data by using the exchanged online transaction key.

Operation 14) Request approval: If the online transaction is required to approve the contactless card 10 according to the result of the EMV payment process in operation 12) above, the POS application 140 requests the online transaction unit 150 to approve the contactless card 10.

Operation 15) Transmit card information: The online transaction unit 150 receives secure data (e.g., card information) of the contactless card 10 from the data storage part 123 in the secure world 120. The secure data which are received by the online transaction unit 150 are received in the encoded form by the online transaction key. Accordingly, the secure data are prevented from being exposed to the elements of the mobile terminal 100 other than the secure world 120.

16) Request approval (including encoded card information): The online transaction unit 150 transmits to the security server 200 an approval requesting message including the encoded secure data (e.g., card information) transmitted by the data storage part 123.

Operation 17) Request approval: The security server 200 decodes the card information transmitted by the online transaction unit 150, and requests the PSP server 300 to approve the contactless card 10.

Operation 18) Result of approval: The security server 200 receives an approval result message from the PSP server 300 according to the request for approval.

Operation 19) Result of approval: The online transaction unit 150 receives the approval result message of the PSP server 300 from the security server 200.

Operation 20) Result of approval: The online transaction unit 150 transmits to the POS application 140 the approval result message of the PSP server 300 transmitted by the security server 200.

Operation 21) Output receipt: The POS application 140 outputs the received approval result message for a user (e.g., seller) 20. The approval result message may be output in the form of a receipt. To do so, the mobile terminal 100 may include an image forming unit for a printing operation or communicate with a device including an image forming unit to transmit a command thereto to output a receipt corresponding to the approval result.

Figure 3:
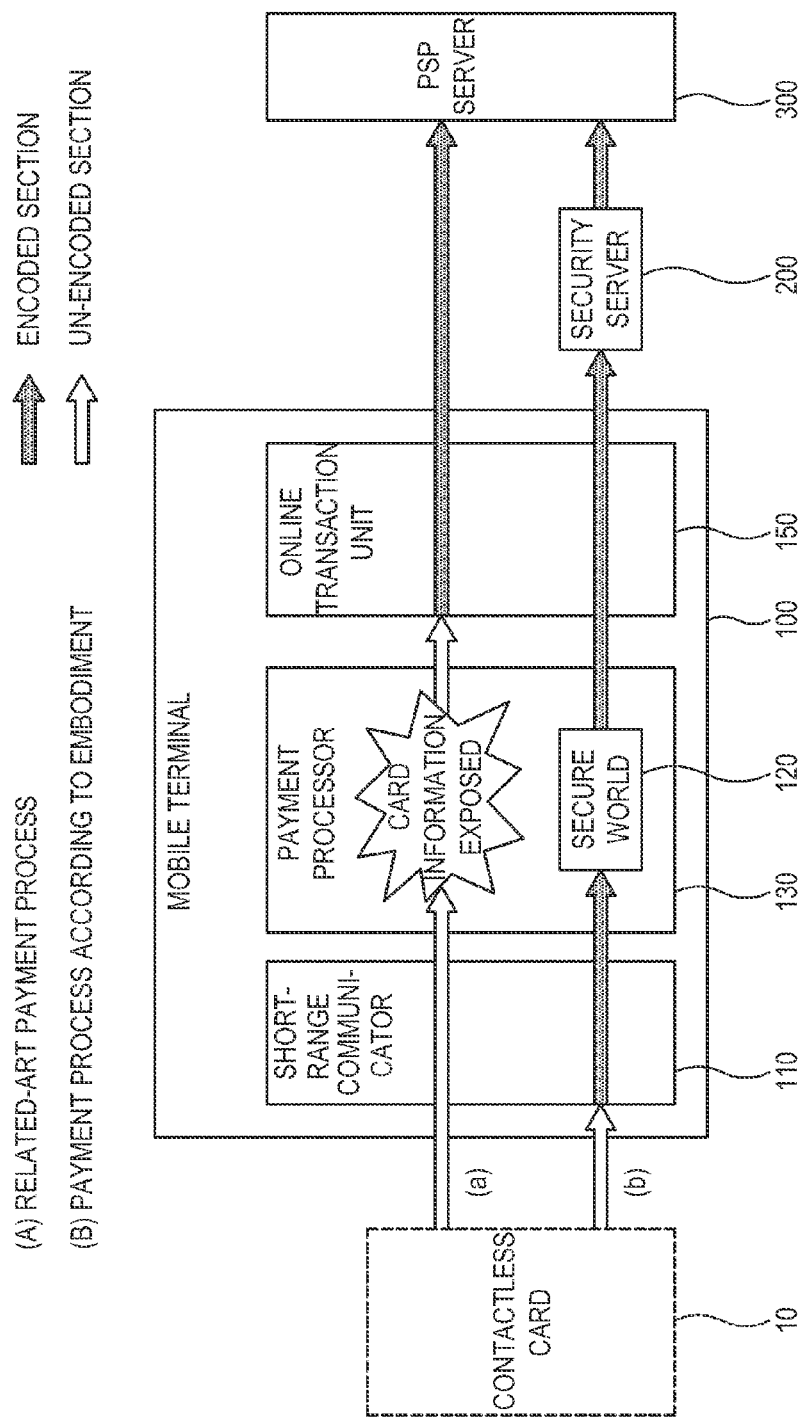
FIG. 3 illustrates comparison between a related-art payment process and a payment process according to an embodiment of the present disclosure.

FIG. 3 illustrates a comparison of a related-art payment process (a) and a payment process (b) according to the first embodiment of the present disclosure.

Referring to FIG. 3, in the related-art payment process (a), data which are transmitted by the short-range communicator 110 to the payment processor 130, and by the payment processor 130 to the online transaction unit 150 are transmitted in the un-encoded form, and secure data such as card information are exposed to other elements of the mobile terminal 100.

In the payment process (b) according to the first embodiment, the mobile terminal 100 includes the secure world 120 therein, and the data transmitted by the short-range communicator 110 to the secure world 120 and by the secure world 120 to the online transaction unit 150 are transmitted in the encoded form, and security may be guaranteed even if the secure data are exposed to other elements of the mobile terminal 100 except for the secure world 120. The secure data remain in the secure world 120 alone, and access to the secure world 120 is not allowed except for a permitted element such as the payment processor 130, and the possibility of exposing the secure information to other applications is removed.

Figure 4:
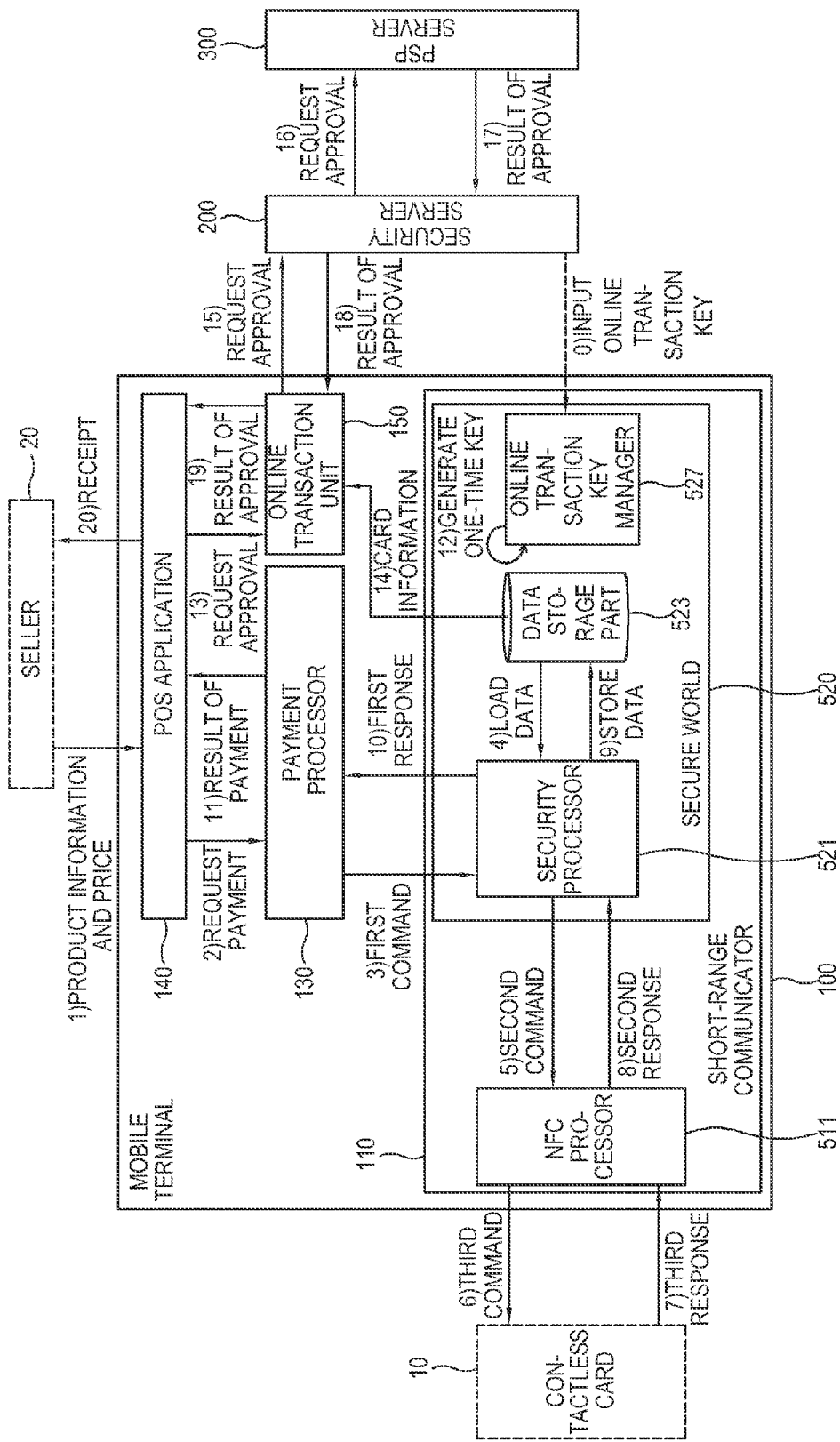
FIG. 4 is a block diagram of a detailed configuration of the mobile terminal in FIG. 1 according to a second embodiment of the present disclosure.

FIG. 4 is a block diagram of a detailed configuration of the mobile terminal 100 in FIG. 1 according to a second embodiment of the present disclosure.

Compared to the mobile terminal 100 in FIG. 2, the mobile terminal 100 according to the second embodiment as shown in FIG. 4 includes a secure world 520 within an short-range communicator 110. Thus, elements other than an NFC processor 511, the secure world 520 and elements of the secure world 520 have the same reference numerals and names as those according to the first embodiment in FIG. 2. The repetitive configuration will not be described in detail to avoid repetitive description.

Referring to FIG. 4, the mobile terminal 100 according to the second embodiment includes an short-range communicator 110, a payment processor 130, a POS application 140 and an online transaction unit 150. The short-range communicator 110 includes an NFC processor 511 and the secure world 520 therein, and the secure world 520 may include a security processor 521, a data storage part 523, and an online transaction key manager 527. Although not shown, the secure world 520 may also include an NFC key manager.

The payment processor 130 performs a payment process according to a preset standard (e.g., EMV payment process).

The POS application 140 is installed in the mobile terminal 100 and executed by a user (e.g., seller) 20, and the seller 20 may execute the POS application 140 to input/calculate product information or price. The seller 20 may input product information (or price) to the POS application 140, and select to purchase the product by the contactless card 10.

The online transaction unit 150 transmits an approval requesting message to the security server 200 according to the result of the payment process between the payment processor 130 and the contactless card 10. The online transaction unit 150 may include a wired/wireless communication module to communicate with the outside including the security server 200.

The security processor 521 performs a process relating to secure data out of the payment process of the payment process 130. In the present embodiment, an example of the security processor 520 which is implemented as a secure EMV processor is explained, and the standard of the payment process is not limited to the foregoing. The data which are transmitted to or by the security processor 521 are the data excluding secure data (fractional data or partial data), or if the data are full data including secure data, the data are transmitted or received in the encoded form.

The data storage part 523 may store therein secure data related to the NFC payment service, and may be accessed by the security processor 521 or the online transaction unit 150.

The secure data stored in the data storage part 523 may include card information of the contactless card 10 such as card number and valid term, and the security processor 521 may load the secure data from the data storage part 523 in the course of the payment process, or filter and store the secure data in the data storage part 523.

The mobile terminal 100 according to the second embodiment as shown in FIG. 4 exchanges data with the security server 200 by the DUKPT technology. The secure data which are loaded from the data storage part 523 to the online transaction unit 150 (e.g., card number) may be encoded by a one-time key that is generated by using an online transaction key that is input in advance, and transmitted in the encoded form to the security server 200.

Since the secure world 520 according to the present embodiment is provided in the short-range communicator 110, the data exchanged between the NFC processor 511 and the security processor 521 do not need to be encoded. For example, the security processor 521 may transmit an un-encoded command to the NFC processor 511, and the NFC processor 511 may transmit the command to the contactless card 10. Likewise, the NFC processor 511 may receive a response from the contactless card 10 and transmit the response to the security processor 521, and the security processor 521 may filter the secure data from the received response and transmit the secure data as a result to the payment processor 130. In the second embodiment, the secure world 520 is provided in the short-range communicator 110, and thus the secure data are prevented from being exposed to other elements (e.g., applications performing other functions not related to the payment process) and security may be guaranteed.

The online transaction key manager 527 generates and stores a one-time key for online transaction, by using the online transaction key information input by the security server 200. The data including an approval requesting message transmitted to the security server 200 may be encoded by the one-time key whenever the online transaction is performed. For example, the approval requesting message transmitted by the online transaction unit 150 to the security server 200 is encoded by the online transaction unit 150 through the one-time key and transmitted in the encoded form to the security server 200, and the security server 200 decodes the approval requesting message by using the known online transaction key information. The security server 200 transmits the decoded approval requesting message to the PSP server 300, and receives an approval result message from the PSP server 300 and transmits the approval result message to the online transaction unit 150. The message exchanged between the security server 200 and the PSP server 300 may be encoded by a preset method as agreed in advance between the security server 200 and the PSP server 300.

Hereinafter, a payment service process of respective elements of the mobile terminal 100 according to the second embodiment will be described in more detail with reference to FIG. 4.

Operation 0) Input online transaction key: To encode data by the DUKPT technology, the online transaction key is input in advance by the security server 200 to the online transaction key manager 527. The process of inputting the online transaction key may be independently performed from the payment service process of the mobile terminal 100.

Operation 1) Input product information: A user (e.g., seller) 20 may request for payment of the product through the POS application 140 installed in the mobile terminal

100. A user may input the payment request through the mobile terminal 100 by executing the POS application 140, and inputting product information and price.

Operation 2) Request payment: The POS application 140 transmits a payment requesting message to the payment processor 130 in response to the user's payment request.

Operation 3) Transmit first command (partial; plain): According to the payment requesting message transmitted by the POS application 140, the payment processor 130 generates a first command according to a preset standard, and transmits the first command to the security processor 521 of the secure world 520 of the short-range communicator 110. In the present embodiment, an example of the preset standard is EMV and an example of the first command is an EMV command. The first command may be an un-encoded, i.e., a plain EMV command as fractional (or partial) data including secure data list to be added.

Operation 4) Load secure data: The security processor 521 receives the first command, and loads the secure data corresponding to the secure data list from the data storage part 523. The security processor 521 may determine whether the received first command includes the secure data list, and may load the concerned secure data according to the determination result. The loaded secure data may include card information of the contactless card 10 as the secure data which should be transmitted to the contactless card 10 in the course of exchanging a plurality of data as needed for the EMV payment process between the contactless card 10 and the mobile terminal 100.

Operation 5) Transmit second command (full; plain): The security processor 521 combines the first command and the data loaded from the data storage part 523 into a second command. The second command is a plain, full EMV command including secure data, and transmitted to the NFC processor 511. As the second command is transmitted to the NFC processor 511, the command may be transmitted to the contactless card 10.

Operation 6) Transmit third command (full; plain): The NFC processor 511 receives the second command, and transmits a third command, into which the second command is generated, to the contactless card 10 by the NFC technology. The command transmitted by the NFC processor 511 to the contactless card 10 is referred to as a third command to be distinguished from the first and second commands, and the third command is a plain, full EMV command including secure data.

Operation 7) Transmit third response (full; plain): The NFC processor 511 receives a third response by the NFC technology from the contactless card 10 corresponding to the third command. Like the third command, the third response is a plain, full EMV response including secure data. The secure data may include card information of the contactless card 10, e.g., card number, valid term, etc.

Operation 8) Transmit second response (full; plain): The NFC processor 511 receives the third response, and transmits a second response, into which the third response is generated, to the security processor 521. The response transmitted by the NFC processor 511 to the security processor 521 is referred to as a second response to be distinguished from the third response and a first response that is described further below, and the third response is a plain, full EMV response including secure data (e.g., card information).

Operation 9) Store secure data: The security processor 521 filters secure data if the second response includes the secure data, and stores the secure date in the data storage part 523. The filtered secure data may include card information of the contactless card 10.

Operation 10) Transmit first response (partial; plain): The security processor 521 transmits to the payment processor 130 a first response generated by filtering the secure data from the second response. The first response transmitted to the payment processor 130 is a plain EMV response as fractional (partial) data excluding secure data. In the mobile terminal 100 according to the present embodiment, the EMV process is performed by using the transmitted first response.

In the present embodiment, in the case of the data which should be secured like the card number of a purchaser, the filtered first response is transmitted to the payment processor 130 to store the data in the secure world 520 and prevent the secure data from being exposed to other elements of the mobile terminal 100 except for the secure world 120.

The processes of transmitting, loading and storing the data according to the payment process in operations 3) to 10) above may be repeatedly performed depending on the standard of the payment process (e.g. EMV payment process). Accordingly, during the payment process, data communication between the NFC processor 511 and the contactless card 10 by the NFC technology is continuously performed. The payment processor 130 sequentially performs the processes for the repetitive payment process, and transmits the result as the final result (EMV result) for the payment request in operation 2) above, to the POS application 140.

Operation 11) Transmit payment result: The payment processor 130 completes all of the payment processes in operations 3) to 10) above, and transmits to the POS application 140 a response result message as a final payment result corresponding to the first response. The response result message may include determination result for the validity of the contactless card 10 and appropriateness of the payment.

Operation 12) Generate one-time key: If an online transaction is required to approve the contactless card 10 according to the result of the EMV payment process, the online transaction key manager 127 generates a one-time key by using the online transaction key input in advance. The online transaction unit 150 encodes the data by using the one-time key generated as above, and the one-time key is automatically removed after being used for the concerned online transaction. The online transaction key manager 527 may generate a one-time key for each online transaction and use the one-time key in encoding the data by the online transaction unit 150.

Operation 13) Request approval: If an online transaction is required to approve the contactless card 10 according to the result of the EMV payment process in operation 11) above, the POS application 140 requests the online transaction unit 150 to approve the contactless card 10.

Operation 14) Transmit card information: The online transaction unit 150 receives secure data (e.g., card information) of the contactless card 10 from the data storage part 523 in the secure world 520. The secure data which are received by the online transaction unit 150 are received in the encoded form by the one-time key. Accordingly, the secure data are prevented from being exposed to other elements of the mobile terminal 100 except for the secure world 520.

Operation 15) Request approval (including encoded card information): The online transaction unit 150 transmits to the security server 200 an approval requesting message including the encoded secure data (e.g., card information) transmitted by the data storage part 523.

Operation 16) Request approval: The security server 200 decodes the card information transmitted by the online transaction unit 150, and requests the PSP server 300 to approve the contactless card 10.

Operation 17) Result of approval: The security server 200 receives an approval result message from the PSP server 300 according to the request for approval.

Operation 18) Result of approval: The online transaction unit 150 receives the approval result message of the PSP server 300 from the security server 200.

Operation 19) Result of approval: The online transaction unit 150 transmits to the POS application 140 the approval result message of the PSP server 300 transmitted by the security server 200.

Operation 20) Output receipt: The POS application 140 outputs the received approval result message for a user (e.g., seller) 20. The approval result message may be output in the form of a receipt. To do so, the mobile terminal 100 may include an image forming unit for a printing operation or communicate with a device including an image forming unit to transmit a command thereto to output a receipt corresponding to the approval result.

In the payment process according to the second embodiment, the mobile terminal 100 includes the secure world 120 therein as in the first embodiment. The secure data remain in the secure world 120 alone, and access to the secure world 120 is not allowed except for the permitted element such as the payment processor 130, and the possibility of exposing the secure information to other applications is removed.

Hereinafter, a payment method according to the present embodiment will be described with reference to FIGS. 5 to 8.

Figure 5:
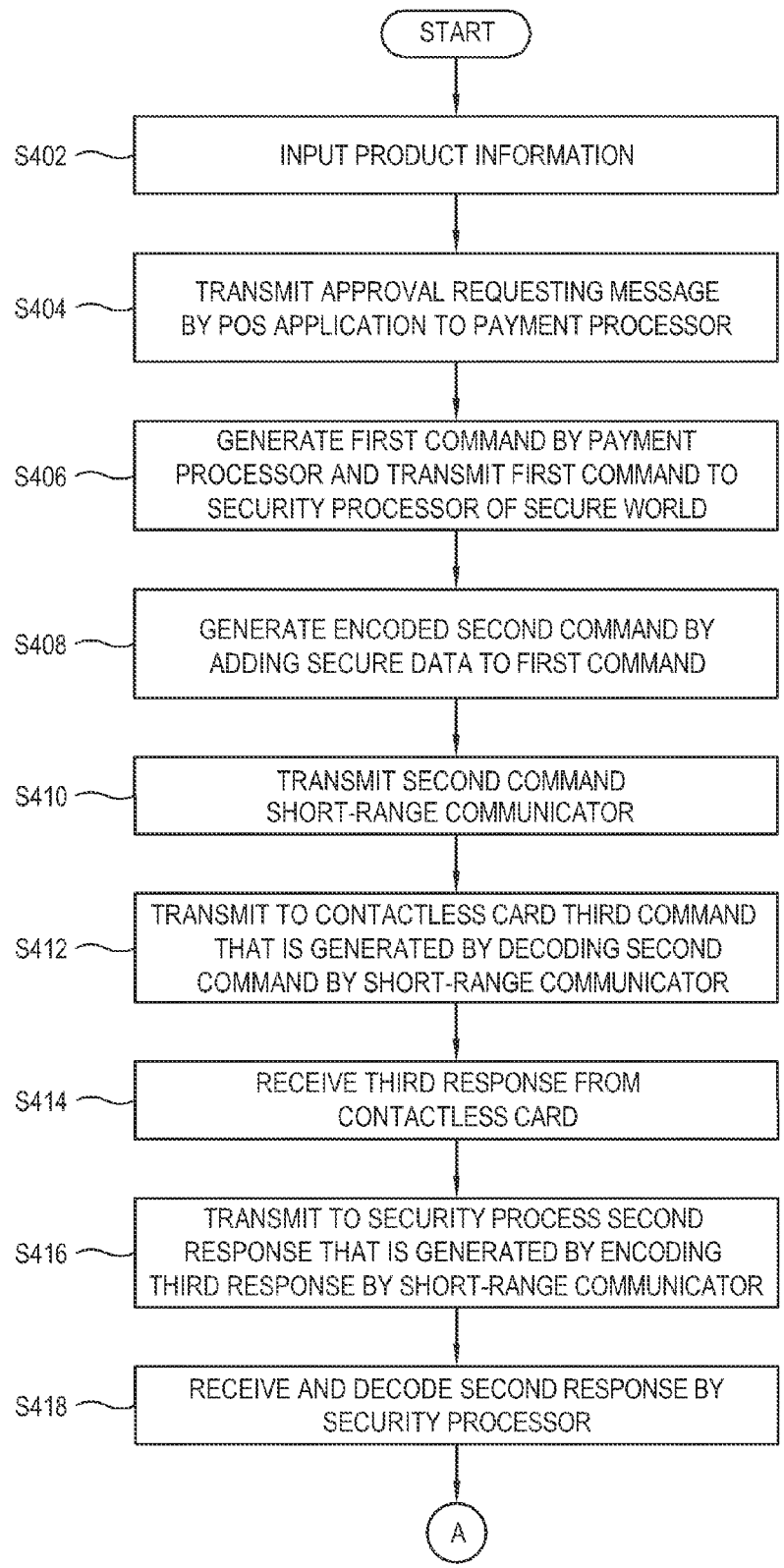
FIGS. 5 and 6 are flowcharts showing a payment method of the mobile terminal according to the first embodiment of the present disclosure.
Figure 6:
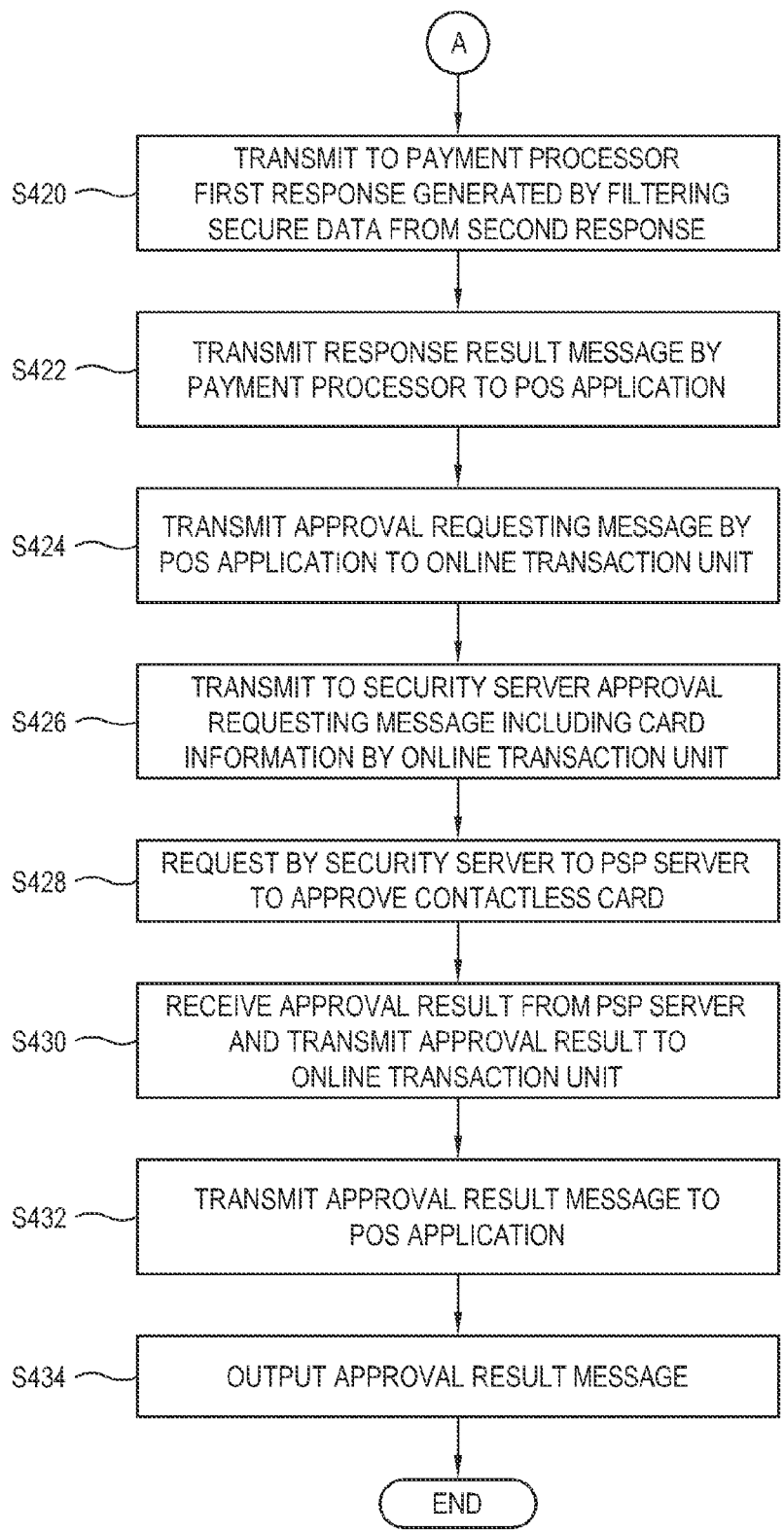

FIGS. 5 and 6 are flowcharts showing a payment method of the mobile terminal 100 according to the first embodiment of the present disclosure.

Referring to FIG. 5, the seller 20 may input product information through the POS application 140 at operation S402.

The POS application 140 transmits to the payment processor 130 the payment requesting message corresponding to the product information input at operation S402 at operation S404.

The payment processor 130 generates the first command corresponding to the payment requesting message transmitted at operation S404, and transmits the first command to the security processor 121 of the secure world 120 at operation S406.

The security processor 121 loads the secure data from the data storage part 123, adds the first command to the secure data to generate the second command therefrom at operation S408.

The second command generated at operation S408 is transmitted to the short-range communicator 110 such as NFC module at operation S410.

The short-range communicator 110 generates the third command by decoding the second command received at operation S410, and transmits the third command to the contactless card 10 at operation S412.

The short-range communicator 110 receives the third response from the contactless card 10 corresponding to the third command at operation S414.

The short-range communicator 110 generates the second response by encoding the third response received at operation S414, and transmits the second response to the security processor 121 at operation S416.

The security processor 121 receives and decodes the second response received at operation S416 at operation S418.

Referring to FIG. 6, the security processor 121 filters the secure data from the second response decoded at operation S418 and stores the secure data in the data storage part 123, and transmits to the payment processor 130 the first response which is generated by filtering the secure data from the second response at operation S420.

The operations S406 to S420 may be repeatedly performed according to the preset payment process, and the payment processor 130 transmits to the POS application 140 the response result message corresponding to the payment requesting message of the operation S404 according to the payment process result of the operations S406 to S420 at operation S422.

The POS application 140 transmits the approval requesting message to the online transaction unit 150 according to the payment requesting message received at operation S422 at operation S424.

The online transaction unit 150 adds the card information of the secure world 120 in the encoded form to the approval requesting message received at operation S424, and transmits the card information to the security server 200 at operation S426.

The security server 200 decodes the card information of the approval requesting message received at operation S426 and requests the PSP server 300 to approve the contactless card 10 at operation S428.

The security server 200 receives from the PSP server 300 the approval result corresponding to the request for approval made at operation S428, and transmits the approval result to the online transaction unit 150 at operation S430.

The online transaction unit 150 transmits to the POS application 140 the approval result message received at operation S430 at operation S432.

The POS application 140 outputs the approval result message received at operation S432, in the form of a receipt for the seller 20 at operation S434.

Figure 7:
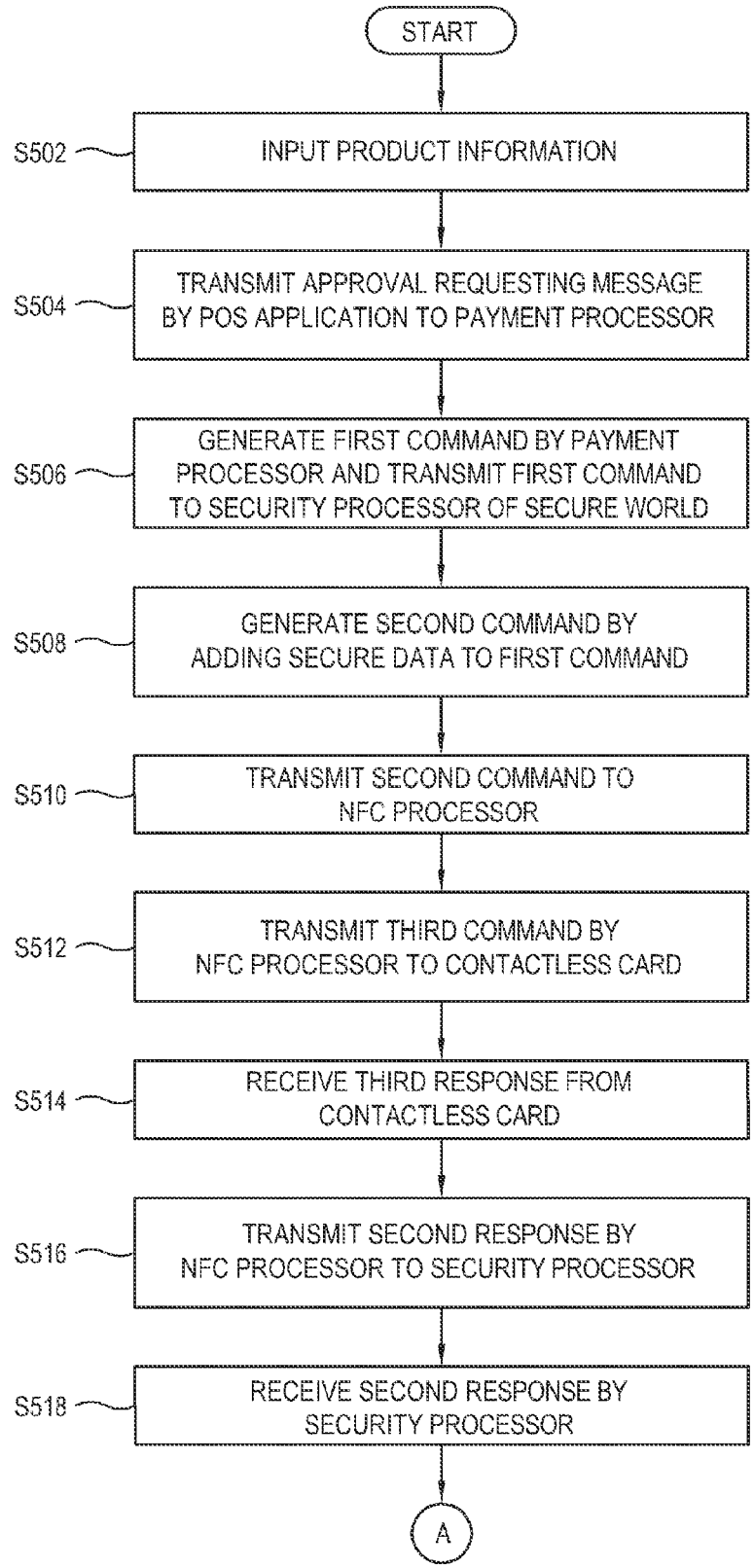
FIGS. 7 and 8 are flowcharts showing a payment method of the mobile terminal according to the second embodiment of the present disclosure.
Figure 8:
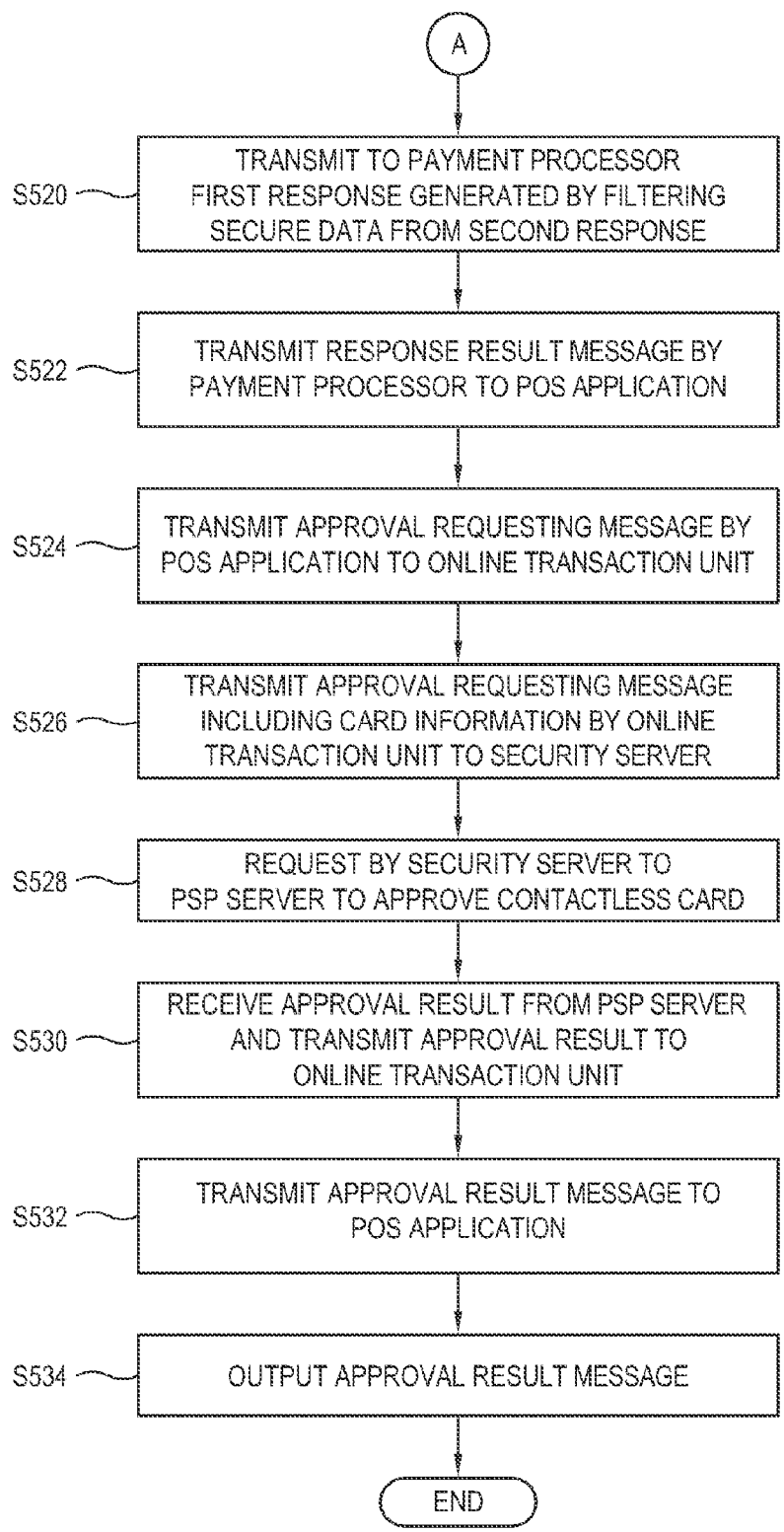

FIGS. 7 and 8 are flowcharts showing a payment method of the mobile terminal 100 according to the second embodiment of the present disclosure.

Referring to FIG. 7, the seller 20 may input product information through the POS application 140 at operation S502.

The POS application 140 transmits a payment requesting message to the payment processor 130 corresponding to the product information input at operation S502 at operation S504.

The payment processor 130 generates the first command corresponding to the payment requesting message transmitted at operation S504, and transmits the first command to the security processor 121 of the secure world 120 at operation S506.

The security processor 121 loads the secure data from the data storage part 123, adds the first command to the secure data and generates the second command therefrom at operation S508.

The second command generated at operation S508 is transmitted to the NFC processor 511 at operation S510.

The NFC processor 511 transmits to the contactless card 10 the third command corresponding to the second command received at operation S510 at operation S512.

The NFC processor 511 receives the third response from the contactless card 10 corresponding to the third command at operation S514.

The NFC processor 511 transmits to the security processor 121 the second response corresponding to the third response received at operation S514 at operation S516.

The security processor 121 receives the second response received at operation S516 at operation S518.

Referring to FIG. 8, the security processor 121 filters the secure data from the second response received at operation S518, stores the secure data in the data storage part 123, and transmits to the payment processor 130 the first response generated by filtering the secure data from the second response at operation S520.

The operations S506 to S520 may be repeatedly performed according to the preset payment process, and the payment processor 130 transmits to the POS application 140 the response result message corresponding to the payment requesting message of the operation S504 according to the payment process result of the operations S506 to S520 at operation S522.

The POS application 140 transmits the approval requesting message to the online transaction unit 150 according to the payment requesting message received at operation S522 at operation S524.

The online transaction unit 150 adds the card information of the secure world 120 in the encoded form to the approval requesting message received at operation S524, and transmits the card information to the security server 200 at operation S526. The added card information may be encoded by the one-time key for the concerned online transaction.

The security server 200 decodes the card information of the approval requesting message received at operation S526, and requests the PSP server 300 to approve the contactless card 10 at operation S528.

The security server 200 receives from the PSP server 300 the approval result corresponding to the request for approval made at operation S528, and transmits the approval result to the online transaction unit 150 at operation S530.

The online transaction unit 150 transmits to the POS application 140 the approval result message received at operation S530 at operation S532.

The POS application 140 outputs the approval result message received at operation S532, in the form of a receipt for the seller 20 at operation S534.

According to various embodiments, during the EMV process based on a smart phone using an open-type mobile platform that is not secured, the secure world 120 (or 520) which stores the secure data therein is additionally provided to prevent exposure of the card information. In particular, if the mobile terminal 100 communicates with the contactless card 10 by the NFC technology, the secure data such as the card information exchanged during the communication with the contactless card 10 are extracted and stored in the secure world 120, and the secure data may be masked at the time of communication with the outside.

Since the data exchanged with the outside of the secure world 120 is encoded, the route of exposing the card information during the communication process between the short-range communicator 110 and the POS application 140 is blocked and the level of security may be further tightened.

Further, the process of encoding and transmitting the card information to the security server 200 at the time of requesting the PSP server 300 to approve the card is added, and the exposure of the card information may be prevented.

While the present disclosure has been shown and described with the reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal comprising:
a first communicator configured to communicate with at least one external device;
a second communicator configured to communicate with a card to receive data comprising payment information and secure information;
a first processor;
a secure storage configured to store information; and
a second processor configured to:
receive, from the second communicator, the payment information and first encoded secure information,
provide the payment information to the first processor,
store secure information in the secure storage by decoding the first encoded secure information, and
encode the stored secure information as second encoded secure information and provide the second encoded secure information to the first processor,
wherein the first processor is configured to:
control the first communicator to transmit the payment information to a first external device, and
control the first communicator to transmit the second encoded secure information to a second external device.

2. The mobile terminal according to claim 1,
wherein the first processor is further configured to generate a first command corresponding to a user's payment request, and
wherein the second processor is further configured to:
transmit a second command generated by adding corresponding secure information to the received first command to a contactless card through an Near Field Communication (NFC) processor of the first communicator, and
transmit to the first processor a first response generated by extracting and filtering secure information from a second response transmitted by the contactless card through the NFC processor.

3. The mobile terminal according to claim 2,
wherein the second processor is provided outside the first communicator, and
wherein the second processor is further configured to:
encode the second command,
transmit the encoded second command to the first communicator,
decode the second response transmitted by the first communicator, and
extract the secure information from the decoded second response.

4. The mobile terminal according to claim 3, wherein the first communicator is configured to:
transmit to the contactless card a third command which is generated by decoding the second command transmitted by the second processor through a predetermined short-range technology, and
transmit to the second processor the second response which is generated by encoding a third response transmitted by the contactless card through short-range technology.

5. The mobile terminal according to claim 3, wherein the second processor further comprises an NFC key manager configured to store therein an NFC key used to encode or decode data.

6. The mobile terminal according to claim 2, wherein the second processor comprises:
   a data storage part configured to store the secure information therein; and
   a security processor configured to:
      generate the second command by loading secure information from the data storage part,
      extract secure information from the second response, and
      store the extracted secure information in the data storage part.
7. The mobile terminal according to claim 2,
   wherein the second processor is provided within the first communicator, and
   wherein the NFC processor of the first communicator and the second processor are configured to exchange un-encoded data.
8. The mobile terminal according to claim 2,
   wherein the first command comprises a secure data list, and
   wherein the second command is generated by adding secure information to the first command corresponding to the secure data list.
9. The mobile terminal according to claim 2, further comprising:
   a Point Of Sales (POS) application configured to:
      receive product information,
      transmit a payment requesting message to the first processor corresponding to the payment request, and
      receive a response result message from the first processor corresponding to the first response.
10. The mobile terminal according to claim 9, further comprising an online transaction unit configured to:
    receive an approval requesting message from the POS application according to the response result message, and
    transmit the approval requesting message to a security server.
11. The mobile terminal according to claim 10, wherein the online transaction unit is further configured to:
    receive the encoded secure information of the contactless card from the second processor, and
    transmit to the security server an approval request message comprising the encoded secure information.
12. The mobile terminal according to claim 11,
    wherein the second processor further comprises an online transaction key manager configured to store therein an online transaction key used to encode or decode data, and
    wherein the online transaction key manager is configured to transmit the online transaction key to the security server.
13. The mobile terminal according to claim 11,
    wherein the second processor further comprises an online transaction key manager configured to store therein an online transaction key input by the security server,
    wherein the online transaction key manager is configured to generate a one-time key by using the input online transaction key, and
    wherein the online transaction unit is configured to encode secure information comprised in the approval requesting message by using the one-time key.
14. A payment method of a mobile terminal which comprises a first communicator configured to communicate with at least one external device, a second communicator configured to communicate with a card to receive data comprising payment information and secure information, a first processor, a secure storage configured to store information, and a second processor, the payment method comprising:
    receiving, by the second processor from the second communicator, the payment information and first encoded secure information;
    providing, by the second processor, the payment information to the first processor;
    storing, by the second processor, secure information in the secure storage by decoding the first encoded secure information,
    encoding the stored secure information as second encoded secure information and providing the second encoded secure information to the first processor,
    wherein the first processor is configured to:
       control the first communicator to transmit the payment information to a first external device and
       control the first communicator to transmit the second encoded secure information to a second external device.
15. The payment method according to claim 14, further comprising:
    generating a first command by the first processor according to the preset standard in response to a user's payment request;
    generating a second command by the second processor by adding corresponding secure information to the first command;
    transmitting the second command by the second processor to the first communicator;
    receiving a second response by the second processor from the first communicator corresponding to a response from a contactless card with respect to the second command; and
    making a first response by the second processor to the first processor which is generated by extracting and filtering secure information from the second response.
16. The payment method according to claim 15,
    wherein the second processor is provided outside the first communicator, and
    wherein the method further comprising:
       encoding the second command and transmitting the encoded second command to the first communicator,
       decoding the second response transmitted by the first communicator, and
       extracting the secure information from the decoded second response.
17. The payment method according to claim 16, further comprising:
    transmitting to the contactless card a third command which is generated by the first communicator by decoding the second command transmitted by the second processor, through contactless predetermined short-range technology; and
    transmitting to the second processor the second response which is generated by the first communicator by encoding a third response transmitted by the contactless card through the predetermined short-range technology.
18. The payment method according to claim 16, further comprising:
    transmitting a Near Field Communication (NFC) key stored in the second processor to the first communicator; and
    storing in the second processor the secure information which has been extracted from the second response.
19. The payment method according to claim 16, further comprising:
    storing secure information in the second processor, wherein the generating of the second command comprises generating the second command by loading the stored secure information.

20. The payment method according to claim 16,
wherein the second processor is provided in the first communicator, and
wherein the second command and the second response are exchanged in an un-encoded form between a Near Field Communication (NFC) processor of the first communicator and the second processor.

* * * * *